United States Patent [19]

Burns et al.

[11] Patent Number: 4,851,090
[45] Date of Patent: Jul. 25, 1989

[54] METHOD AND APPARATUS FOR ELECTROCHEMICALLY MACHINING AIRFOIL BLADES

[75] Inventors: Norbert A. Burns, Cincinnati; John S. Reynolds, Maineville, both of Ohio; Willard Hansen, Pembroke; Kenneth R. Hutton, Nashua, both of N.H.

[73] Assignee: General Electric Company, Lynn, Mass.

[21] Appl. No.: 49,080

[22] Filed: May 13, 1987

[51] Int. Cl.⁴ .................. B23H 3/04; B23H 3/10; B23H 9/10
[52] U.S. Cl. .................. 204/129.7; 204/224 M; 204/225; 204/212
[58] Field of Search ............... 204/129.1, 224 M, 225, 204/212, 129.7

[56] References Cited

U.S. PATENT DOCUMENTS

| | | | |
|---|---|---|---|
| Re. 31,605 | 6/1984 | Neal et al. | 204/129.35 |
| 3,046,206 | 7/1962 | Johnson et al. | 204/129.43 |
| 3,095,364 | 6/1963 | Faust et al. | 204/129.5 |
| 3,219,569 | 11/1965 | Wilkinson | 204/224 M |
| 3,268,434 | 8/1966 | Weingartner | 204/224 M |
| 3,271,291 | 9/1966 | Crawford et al. | 204/224 M |
| 3,338,807 | 8/1967 | Clifford | 204/129.4 |
| 3,372,099 | 3/1968 | Clifford | 204/129.2 |
| 3,459,645 | 8/1969 | Wilson et al. | 204/129.35 |
| 3,466,235 | 9/1969 | Williams | 204/224 M |
| 3,536,603 | 10/1970 | Bonga | 204/224 R |
| 3,551,310 | 12/1970 | Inoue | 204/129.6 |
| 3,563,876 | 2/1971 | Malkowski et al. | 204/212 |
| 3,630,877 | 12/1971 | Koike et al. | 204/224 M |
| 3,714,017 | 1/1973 | Stark et al. | 204/284 |
| 3,803,009 | 4/1974 | Kawafune et al. | 204/129.1 |
| 3,849,273 | 11/1974 | Johnson | 204/129.6 |
| 3,970,538 | 7/1976 | Lucas | 204/224 M |
| 4,029,928 | 6/1977 | Ullmann et al. | 219/69 E |
| 4,052,284 | 10/1977 | Schrader | 204/224 M |
| 4,057,475 | 11/1977 | Schrader | 204/129.1 |
| 4,167,462 | 9/1979 | Schrader et al. | 204/129.25 |
| 4,256,555 | 3/1981 | Wilson et al. | 204/129.5 |
| 4,468,304 | 8/1984 | Hill | 204/129.6 |
| 4,657,645 | 4/1987 | Hinman | 204/129.1 |
| 4,657,649 | 4/1987 | Hinman | 204/224 M |

FOREIGN PATENT DOCUMENTS 2153135  5/1973  Fed. Rep. of Germany .
2084504 12/1971  France .

OTHER PUBLICATIONS

Stuart Birch: *Aerospace Engineering*, "International Viewpoints", Jan. 1986, pp. 16–18.

*Primary Examiner*—Donald R. Valentine
*Attorney, Agent, or Firm*—Francis L. Conte; Derek P. Lawrence

[57] ABSTRACT

In accordance with a preferred, exemplary embodiment of the invention, a method of forming a blisk from a workpiece is disclosed. The workpiece includes a blank having oppositely facing first and second faces defined by a radially inner housing, a radially outer top, a first edge, and a second edge. The method comprises the steps of:

positioning first and second electrodes adjacent to the first and second faces, respectively, of the blank;

supplying a positive voltage to the blank and a negative voltage to the first and second electrodes;

channeling an electrolyte between the blank and the first and second electrodes for electrochemically machining the blank;

moving the first and second electrodes toward the first and second faces of the blank; and moving the workpiece toward the first and second electrodes.

In accordance with another embodiment of the invention, an apparatus is disclosed for practicing the method.

In accordance with another embodiment of the invention, an electrode pair is disclosed for electrochemically machining an airfoil.

23 Claims, 9 Drawing Sheets

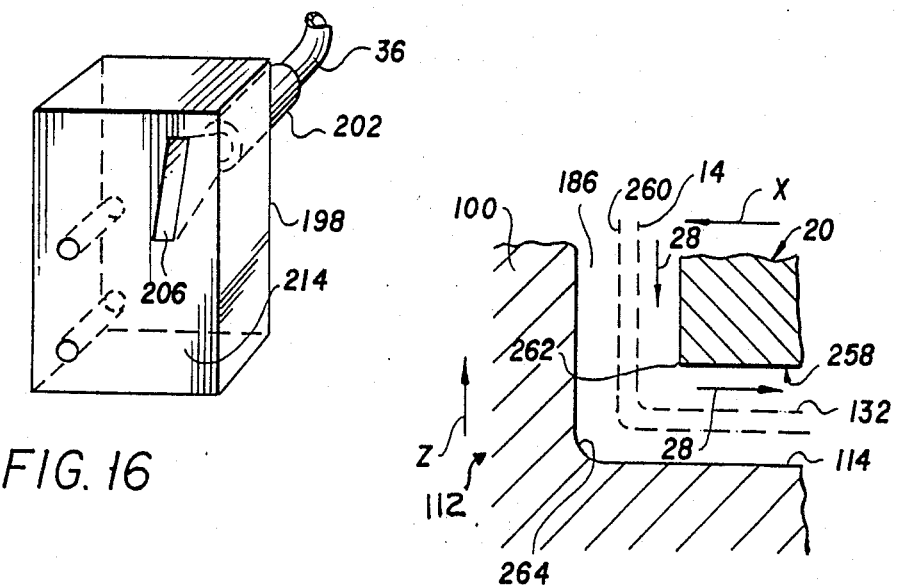
FIG. 16
FIG. 18
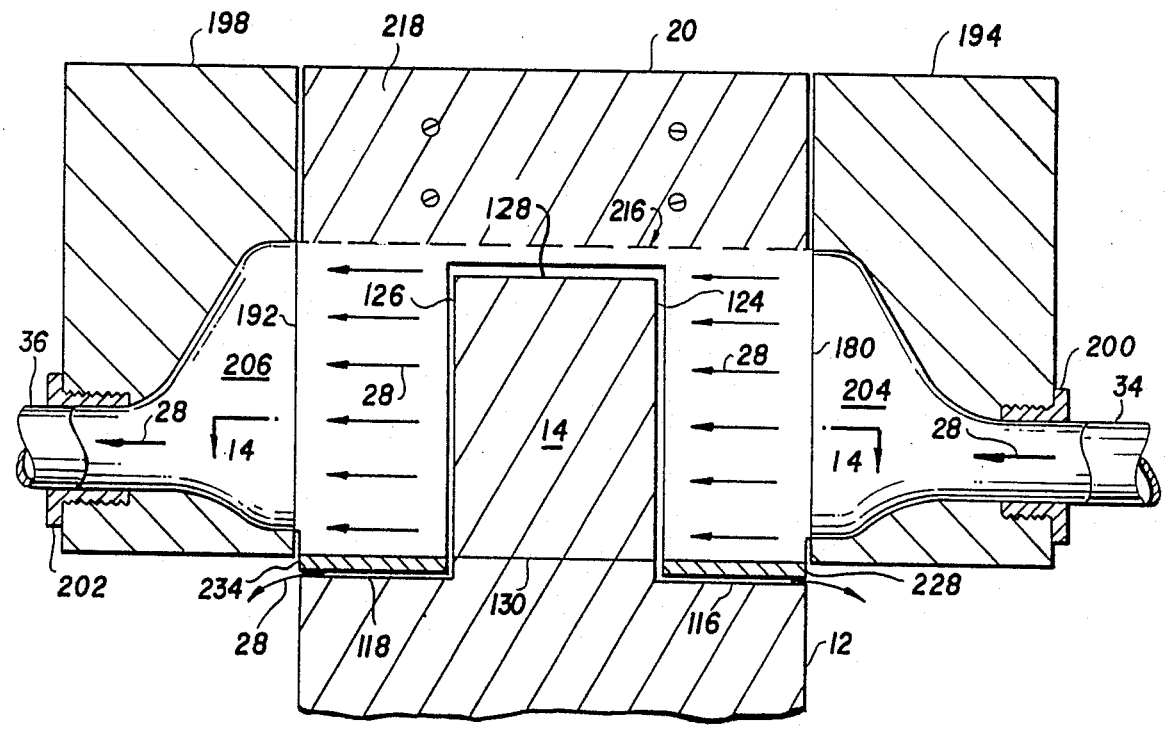
FIG. 17

METHOD AND APPARATUS FOR ELECTROCHEMICALLY MACHINING AIRFOIL BLADES

CROSS-REFERENCE TO RELATED APPLICATION

This application is related to concurrently filed application Ser. No. 049,079 entitled "Electrodes for Electrochemically Machining Airfoil Blades" by N. A. Bruns et al, which is assigned to the same assignee as the present application.

BACKGROUND OF THE INVENTION

This invention relates generally to electrochemically machining of metallic parts, and, more specifically, to electrochemically machining airfoils.

Electrochemical machining (hereinbelow also referred to alternatively as simply machining) is a conventional process in which a workpiece is typically provided with a positive voltage to create an anode, and an electrode is provided with a negative voltage to create a cathode. DC voltages between about 5–25 volts and up to about 15–30,000 amps are typically used. An electrolyte is then channeled in the space or gap between the workpiece and the electrode for electrochemically machining the workpiece. Such gap must be accurately maintained to avoid damaging sparking, or arcing, which would occur with gaps which are too small or cause too little electrolyte flow.

The prior art includes various methods for electrochemically machining airfoil blades, either singly or on a unitary integral bl(aded-d)isk assembly, i.e. blisk. Leading and trailing edges of an airfoil blade are especially difficult to machine precisely, and the prior art teaches various apparatus therefor.

Blisks having high camber, high twist and/or high solidity create substantial problems for economically electrochemically machining blades thereon. Camber refers to the angle of blade tip with respect to a centerline axis. Twist refers to the difference in camber angles between blade root and blade tip. And solidity refers to the number of blades with respect to the circumference of a blisk with high solidity indicating relatively closely-spaced blades.

An apparatus for efficiently and economically electrochemically machining blisks, therefore, must do so in relatively few operations and without utilizing relatively complex structures.

OBJECTS OF THE INVENTION

Accordingly, an object of the present invention is to provide a new and improved method and apparatus for electrochemically machining an airfoil.

Another object of the present invention is to provide a new and improved method and apparatus for electrochemically machining a blisk.

Another object of the present invention is to provide a new and improved method and apparatus for electrochemically machining an airfoil in a single operation from a workpiece blank.

Another object of the present invention is to provide a new and improved method and apparatus for precisely electrochemically machining both leading and trailing edges of a workpiece blank in addition to the surfaces therebetween.

Another object of the present invention is to provide a new and improved method and apparatus for electrochemically machining a platform between adjacent blades on a blisk simultaneously with electrochemically machining a blade thereon.

SUMMARY OF THE INVENTION

In accordance with a preferred, exemplary embodiment of the invention, a method of forming a blisk from a workpiece is disclosed. The workpiece includes a blank having oppositely facing first and second faces defined by a radially inner base, a radially outer top, a first edge, and a second edge. The method comprises the steps of:

positioning first and second electrodes adjacent to the first and second faces, respectively, of the blank;

supplying a positive voltage to the blank and a negative voltage to the first and second electrodes;

channeling an electrolyte between the blank and the first and second electrodes for electrochemically machining the blank;

moving the first and second electrodes toward the first and second faces of the blank; and moving the workpiece toward the first and second electrodes.

In accordance with another embodiment of the invention, an apparatus is disclosed for practicing the method.

In accordance with another embodiment of the invention, a new and improved electrode pair is disclosed for electrochemically machining an airfoil.

BRIEF DESCRIPTION OF THE DRAWINGS

The novel features believed characteristic of the invention are set forth in the appended claims. The invention, in accordance with preferred and exemplary embodiments thereof, and including additional objects and advantages, is more particularly described in the following detailed description taken in conjunction with the accompanying drawings in which:

FIG. 16 is a perspective view of an electrolyte outlet block taken along line 16—16 in FIG. 12.

FIG. 17 is a partly sectional view taken along a centerline of the flowpath of electrolyte through the electrode pair illustrated in FIG. 12 taken along line 17—17.

FIG. 18 is a sectional view of a portion of one electrode and the workpiece blank illustrated in FIG. 14 taken along line 18—18.

DETAILED DESCRIPTION

Figure 1:
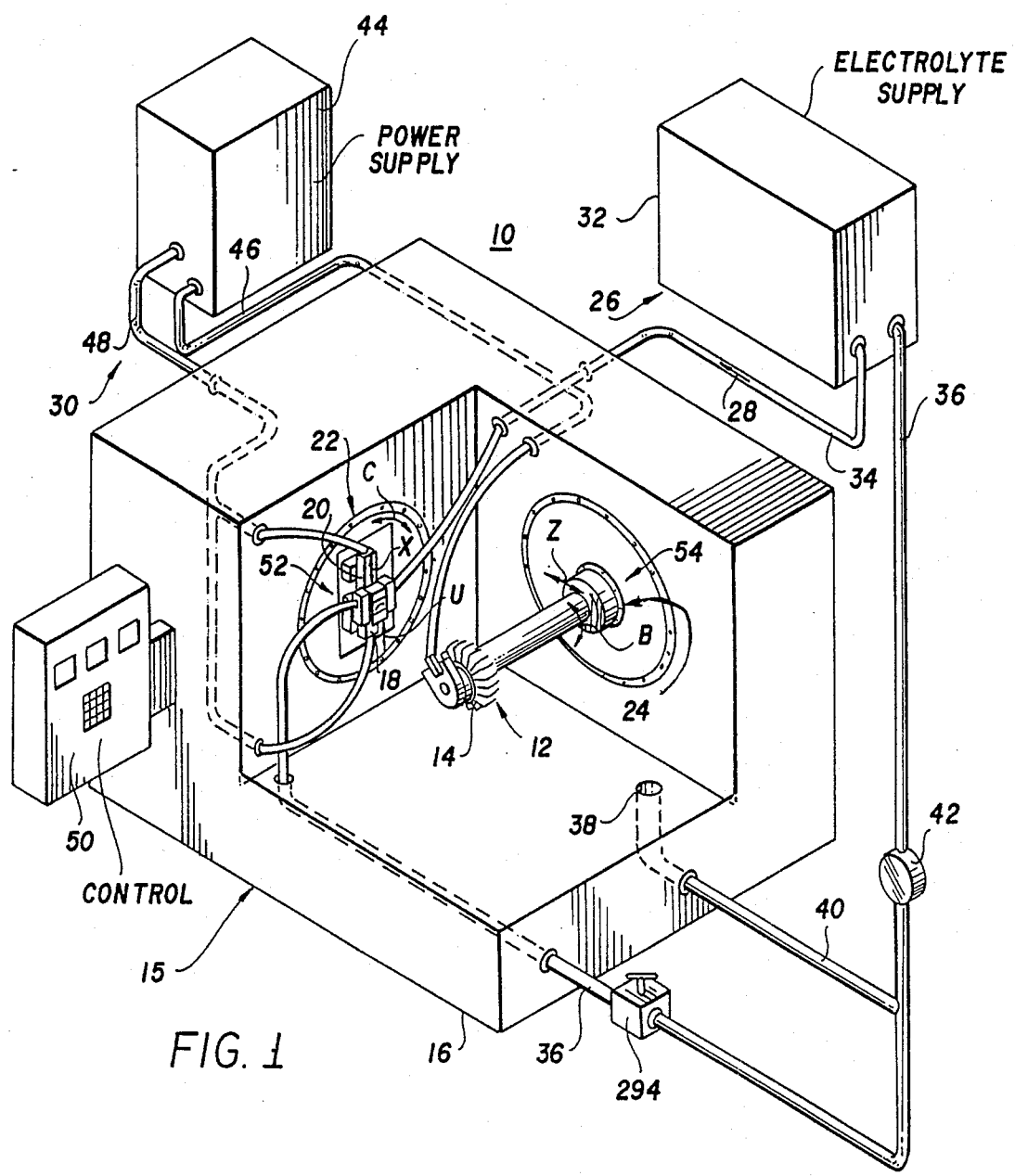
FIG. 1 is a perspective view of an apparatus, in part schematic, including a machine for electrochemical machining in accordance with a preferred embodiment of the present invention.

Illustrated in FIG. 1 is an apparatus 10 for electrochemically machining or forming a blisk from a workpiece 12 having a plurality of circumferentially-spaced workpiece blanks 14. The apparatus 10 includes an electrochemical machine 15 having a housing 16, a pair of electrodes including a first electrode 18 and a second electrode 20, and means 22 for mounting the electrode pair to the housing 16. Means 24 for mounting the workpiece 12 to the housing 16 are also provided.

The apparatus 10 further includes means 26 for channeling electrolyte 28 to the electrode pair and means 30 for powering the electrode pair with a negative voltage and the workpiece 12 with a positive voltage. The electrolyte 28 is conventional and may include a solution of water and sodium chloride and/or sodium nitrate, or other effective electrolyte solution.

The electrolyte channeling means 26 includes a conventional electrolyte supply 32, which provides relatively clean and temperature controlled electrolyte 28 to the electrode pair 18, 20 through a supply conduit 34. The supply 32 is conventional and includes, in part, a high pressure pump, in-line filter, temperature controlling means and suitable control valves (all not shown). A return conduit 36 receives the electrolyte 28 from the electrode pair for return to the supply 32. A drain 38 formed in the housing 16 is provided for capturing any electrolyte 28 which leaks and returning it to the supply 32 through a drain conduit 40 connected to the return conduit 36. A conventional pump 42 is disposed in the return conduit 36 for returning electrolyte 28 from the electrode pair and the drain 38 to the supply 32.

The power means 30 includes a conventional power supply 44 effective for providing DC power between 5 and 25 volts and at up to 15,000 amperes. Current up to 30,000 amperes could also be used for machining relatively large workpieces 12. A positive cable 46 connects the power supply 44 to the workpiece 12. A negative cable 48 connects the power supply 44 to both the first and second electrodes 18 and 20. A negative voltage is supplied through the cable 48 to the first and second electrodes 18 and 20, and a positive voltage is supplied through the cable 46 to the workpiece 12.

The apparatus 10 further includes a conventional control means 50 suitably connected to and effective for electrically controlling the electrode mounting means 22, the workpiece mounting means 24, the power means 30 and the channeling means 26.

The electrode mounting means 22 provides colinear translation of the electrode pair with translation of the first electrode 18 occurring in a U direction or axis, and translation of the second electrode 20 occurring in an X direction or axis parallel to the U direction. The means 22 also mounts the electrode pair as described in more particularity below for rotation in an annular C direction. A conventional elastic seal 52 allows the mounting means 22 to translate and rotate while preventing the electrolyte 28 from contacting the conventional mechanisms providing for movement in the X, U, and C directions. The seal 52 includes, for example, bellows-like folds (not shown) for accommodating X and U translation. And, at a radially outer perimeter thereof, the seal 52 includes an annular sliding seal for accommodating C rotation.

The workpiece mounting means 24, also more particularly described hereinbelow, is effective for translating the workpiece 12 in a Z direction or axis and rotating the workpiece 12 in an annular B direction. A conventional elastic seal 54 is provided for allowing the mounting means 24 to translate and rotate while preventing the electrolyte 28 from contacting the conventional mechanisms of the mounting means 24 in the housing 16. The seal 54 includes, for example, bellows-like folds (not shown) for accommodating Z translation. And, at a radially inner perimeter thereof, the seal 54 includes an annular sliding seal for accommodating B rotation.

Figure 2:
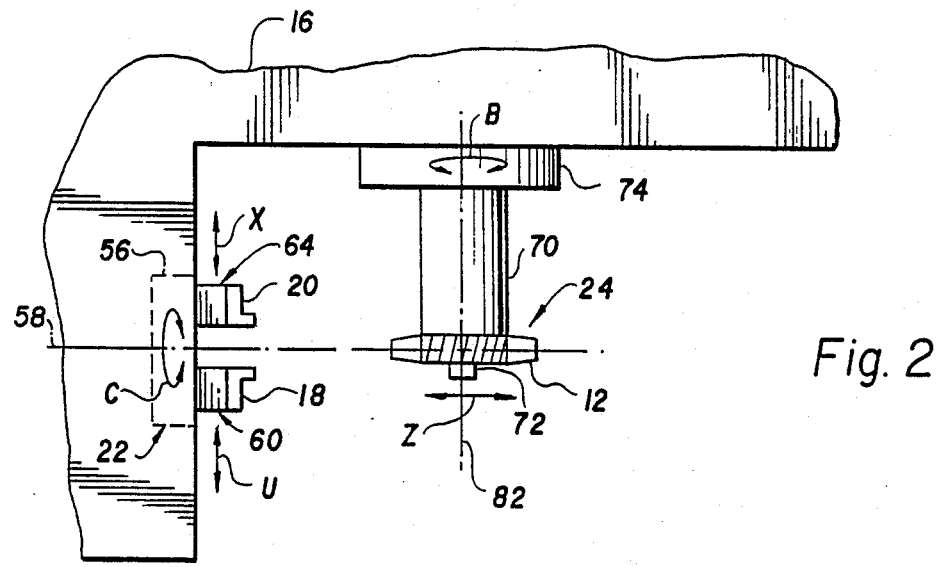
FIG. 2 is a plan view of a portion of the electrochemical machine illustrated in FIG. 1 in a horizontal plane.
Figure 3:
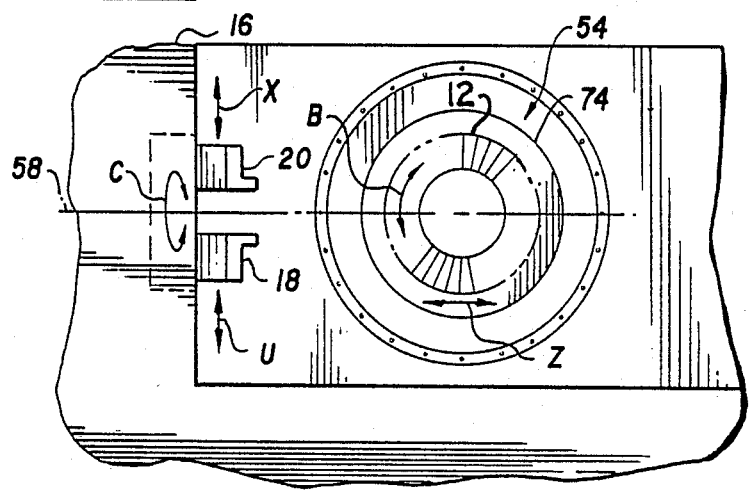
FIG. 3 is a plan view of a portion of the electrochemical machine illustrated in FIG. 1 in a vertical plane disposed normal to the horizontal plane of FIG. 2.
Figure 4:
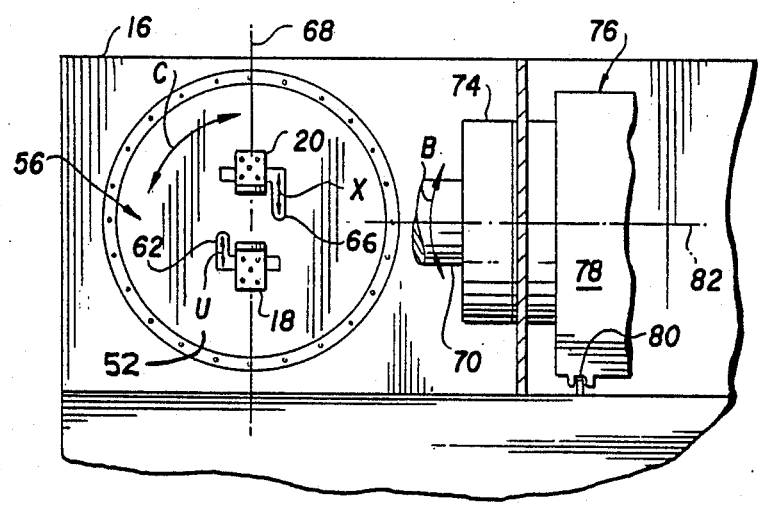
FIG. 4 is a plan view of a portion of the electrochemical machine illustrated in FIG. 1 in a second vertical plane normal to both the horizontal plane of FIG. 2 and the vertical plane of FIG. 3.

FIGS. 2–4 illustrate in more particularity certain features of the housing 16. The electrode mounting means 22 includes a first turntable 56 suitably attached to the housing 16 and rotatable in the C direction about a first centerline or rotation axis 58 extending normal thereto. The turntable 56 is conventionally mounted for allowing rotation in either a positive or negative C direction about the first axis 58.

The mounting means 22 further includes a first translation means 60 having a first L-shaped support 62 suitably connected to the first turntable 56 for movably mounting the first electrode 18 thereto. The first support 62 extends through the elastic seal 52 and is suitably connected to a conventional power screw (not shown), for example, which is effective for causing the support 62 to translate along the U axis in either a positive or negative direction.

The mounting means 22 also includes a second translation means 64 effective for translating the second electrode 20 along the X axis. The second translation means 64 includes a second L-shaped support 66 suitably connected to the first turntable 56 for movably mounting the second electrode 20 thereto. The second support 66 extends through the elastic seal 52 and is suitably connected to a conventional power screw, for example, effective for translating the second support 66 along the X axis in either a positive or negative direction.

The first and second electrodes 18 and 20 are mounted on the first and second supports 62 and 66, respectively, along a longitudinal centerline, or first translation, axis 68, which is parallel to the X and U axes. The first translation axis 68 is perpendicular to the first rotation axis 58.

The workpiece mounting means 24 includes a shaft 70 having a shoulder against which the workpiece 12 is suitably secured by a nut 72, for example. The shaft 70 is suitably coaxially connected to a second turntable 74. The turntable 74 is suitably connected to a third translation means 76 slidingly attached to the housing 16. The translation means 76 includes a housing 78 which contains conventional structures for rotatably supporting the second turntable 74 thereto for obtaining rotation thereof in the B direction. The housing 78 is conventionally attached to the housing 16 by sliding rails 80, which includes a conventional feed screw (not shown), which allow for translation of the housing 78 along the Z axis in either positive or negative directions.

The second turntable 74 and shaft 70 include a centerline or second rotation axis 82, about which axis 82 the turntable 74 rotates in either positive or negative B directions. The second rotation axis 82 is coplanar with the first rotation axis 58 and perpendicular thereto.

The control means 50 is suitably connected to and is effective for independently controlling the movement of the first and second turntables 56, 74, and the first, second and third translation means 60, 64, and 76. The control means 50 is effective for controlling rotation of the second turntable 74 to index a first blank 14 of the workpiece 12 into a machining position and then translating the workpiece 12 toward the electrode pair. The control means 50 is also effective for controlling rotation of the first turntable 56 and translation of the first and second electrodes 18 and 20 connected thereto. As will be described in more particularity hereinbelow, the control means 50 coordinates the independent movement of the electrode pair and the blank 14 along the X, U, C and Z directions so that the electrodes 18 and 20 are brought into an initial machining position adjacent to the blank 14. The control means then similarly coordinates the independent, but coordinated, movement thereof during machining. Such movements may include rotation of the electrode pair to twist the pair relative to the blank 14.

Figure 5:
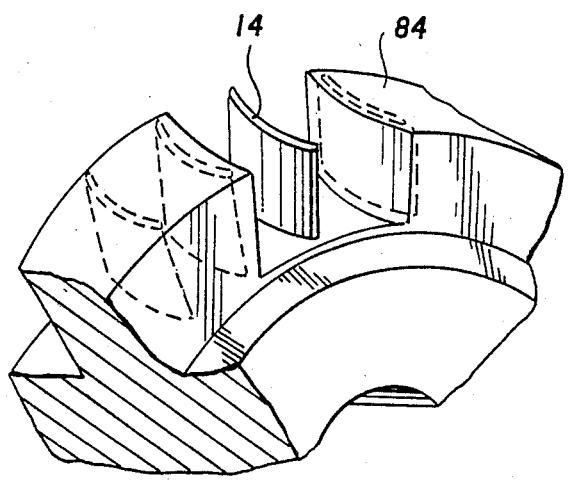
FIG. 5 is a perspective view of a portion of a rough workpiece used for manufacturing a blisk.

Illustrated in FIG. 5 is a perspective, partly sectional view of a rough workpiece 84, from which the workpiece 12 is formed. The blanks 14 may be formed in the workpiece 84 using conventional multiaxis milling machines, or they may be formed using the machine 15.

Figure 6:
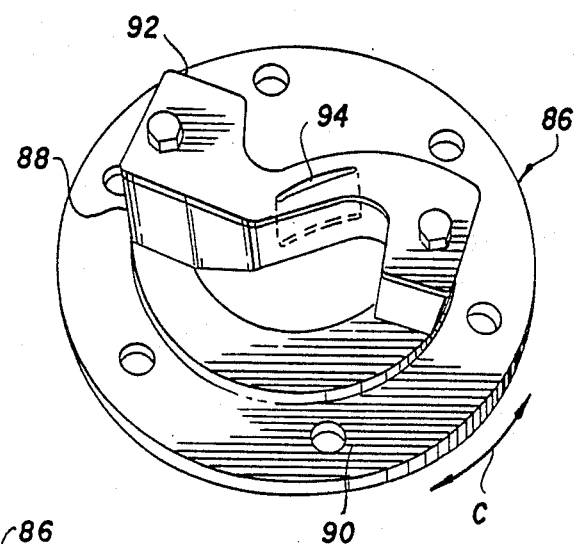
FIG. 6 is a perspective view of a roughing electrode usable for electrochemically machining blanks from the rough workpiece illustrated in FIG. 5.

Illustrated in FIG. 6, for example, is a roughing electrode 86 including a nonconductive body 88 suitably attached to a supporting ring 90 at one end thereof, and having a substantially flat plate electrode 92 at the other end thereof. The electrode 92 and body 88 include an airfoil-shaped aperture 94 therethrough.

Figure 7:
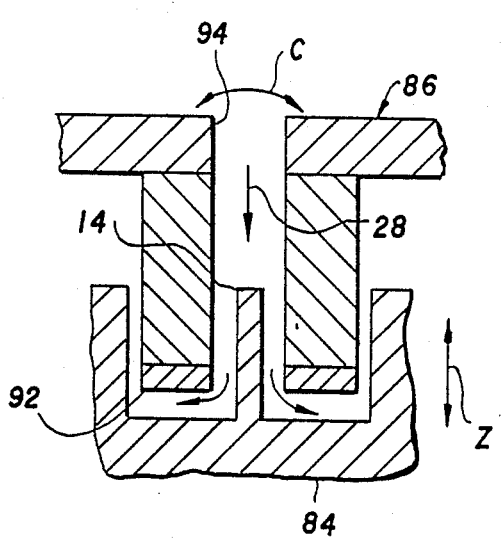
FIG. 7 is a sectional view of a portion of the roughing electrode of FIG. 6 and a portion of the rough workpiece illustrated in FIG. 5 illustrating electrochemical machining thereof.

The electrode 86 may be suitably connected to either or both of the supports 62 and 66 of the first translation means 60. The rough workpiece 84 is suitably connected to the shaft 70 of the mounting means 24. The negative cable 48 is suitably connected to the plate electrode 92, and the positive cable 46 is suitably connected to the workpiece 84. The workpiece 84 is then moved in the Z direction toward the electrode 84, as illustrated in more particularity in FIG. 7. Electrolyte 28 is channeled through the aperture 94, and electrochemical machining occurs between plate electrode 92 and the workpiece 84 for machining the blank 14. For twisted blanks 14, the first turntable 56 rotates the electrode 86 in the C direction as the workpiece 84 is translated theretoward in the Z direction until the blank 14 is completely machined.

The workpiece 84 and the electrode 86 are then retracted from each other and then the workpiece 84 is indexed in the B direction by the second turntable 74 for repeating the machining operation described above for an adjacent blank 14. This process is repeated until all blanks 14 are formed in the workpiece 84.

Figure 8:
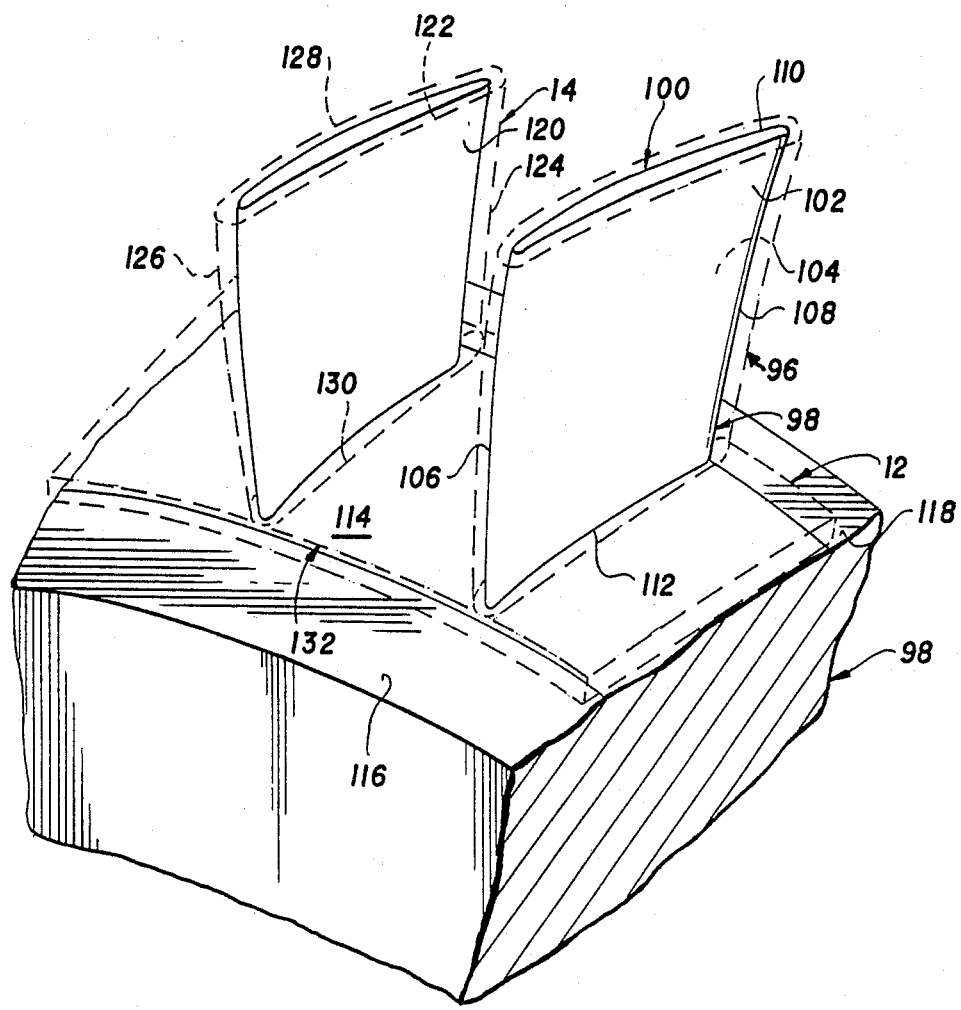
FIG. 8 is a perspective, partly sectional, view of a portion of a blisk workpiece formed from the rough workpiece illustrated in FIG. 5.

FIG. 8 illustrates a perspective view of a portion of the workpiece 12 after having been electrochemically machined by the apparatus 10. The dashed line outline 96 represents the initial outline of the workpiece 12 including the blanks 14. The solid line outline 98 represents the shape of the finally-formed blisk 98. The difference between the solid and dashed lines is typically about 30 mils (i.e. 0.030 inch), for example.

The blisk 98 includes a plurality of circumferentially spaced blades 100, each having a first, generally concave side 102 and a second, generally convex side 104 defined by a leading edge 106, a trailing edge 108, a tip 110, and a root 112. Between the roots 112 of adjacent blades 100 is a platform 114. The blisk 98 further includes a first shoulder 116 extending upstream from the platforms 114 and the leading edges 106, and a second shoulder 118 extending aft of the platforms 114 and the trailing edges 108. The first and second shoulders 116 and 118 are shown schematically and may include conventional curvic coupling means (not shown) formed therein for securing the blisk 98 to adjacent structures in a gas turbine engine.

Each of the workpiece blanks 14 includes a first face 120 and an opposite second face 122 defined between a first radially extending edge 124, a second radially extending edge 126 disposed opposite to the first edge 124, a radially outer top 128, and a radially inner base 130. Between the bases 130 of adjacent blanks 14 is a land 132.

The first face 120, second face 122, first edge 124, second edge 126, top 128, base 130, and land 132 of the workpiece 12 represent the initial structures before electrochemical machining resulting in final structures of the blisk 12 including the first side 102, the second side 104, trailing edge 108, leading edge 106, tip 110, root 112, and platform 114, respectively.

Figure 9:
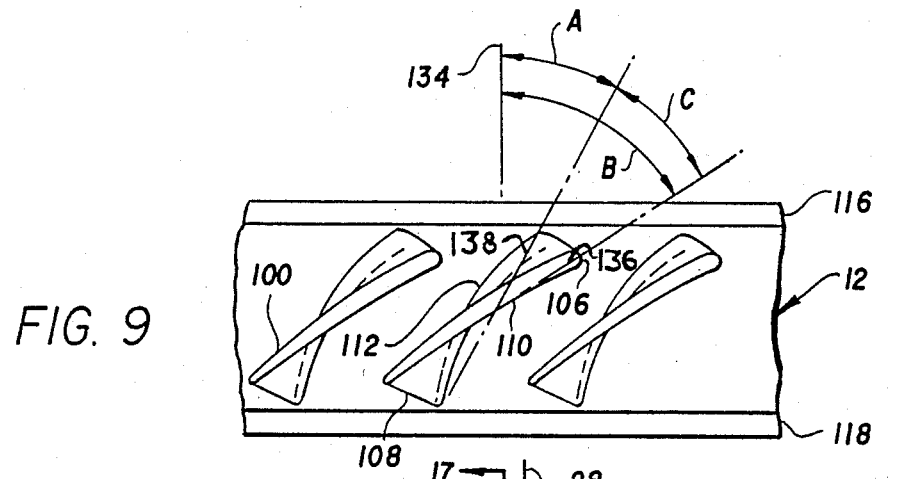
FIG. 9 is an elevation view of a portion of a finally electrochemically machined blisk formed from the workpiece illustrated in FIG. 8.

Illustrated in FIG. 9 is a top view of the blisk 12 including blades 100. The camber of the blade tip 110 is represented by the angle B from an axial centerline 134 of the blisk 12 to a chord 136 drawn between the trailing edge 108 and the leading edge 106 of the blade tip 110. The camber of the root 112 is represented by the angle A from the centerline 134 to a similarly defined chord 138 of the root 112. The twist angle of the blade 100 is represented by the angle C, the difference between the camber angles A and B. One feature of the present invention is the ability to electrochemically machine a blisk 12 having blades 100 with relatively high camber and twist, for example, a camber angle A of about 30°, a camber angle B of about 65°, with a twist angle C of 35°. The solidity of the blisk 12 is represented by the number of blades 100 relative to the circumference; and the present invention is effective for forming blisks 12 having relatively high solidity, for example, of about 22 blades in a blisk 12 having an outer diameter of about 7.5 inches and, for another example, about 32 blades in a blisk 12 having an outer diameter of about 6 inches.

Figure 10:
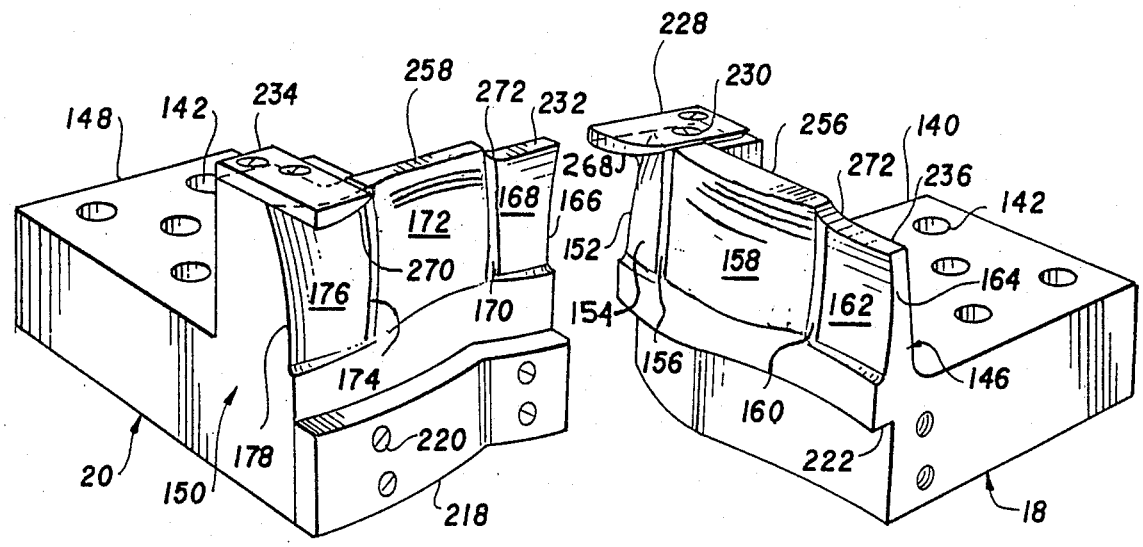
FIG. 10 illustrates front perspective views of complementary electrodes usable for electrochemically machining blisk blades in accordance with one embodiment of the invention.
Figure 11:
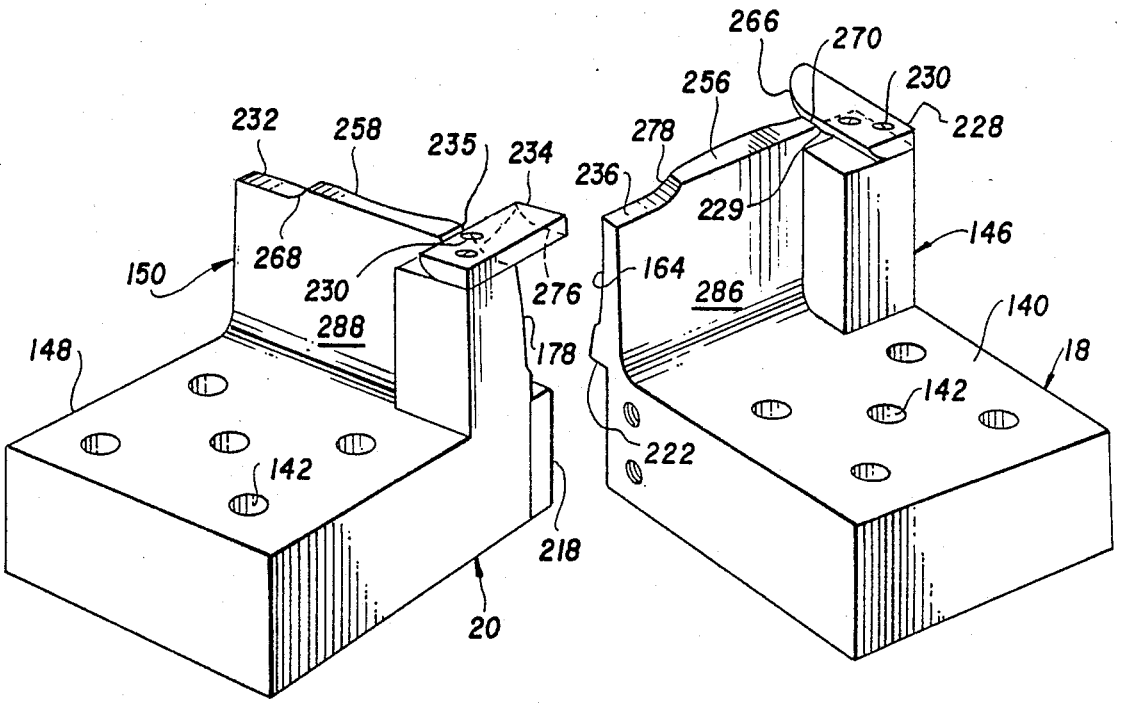
FIG. 11 illustrates back perspective views of the electrodes illustrated in FIG. 10.

Illustrated in FIGS. 10 and 11 are perspective isolated views of the first and second electrodes 18, 20 showing the fronts and backs thereof. The electrode pair may be made of any suitable electrically-conducting material having adequate structural strength such as, for example, a copper-aluminum alloy.

Figure 15:
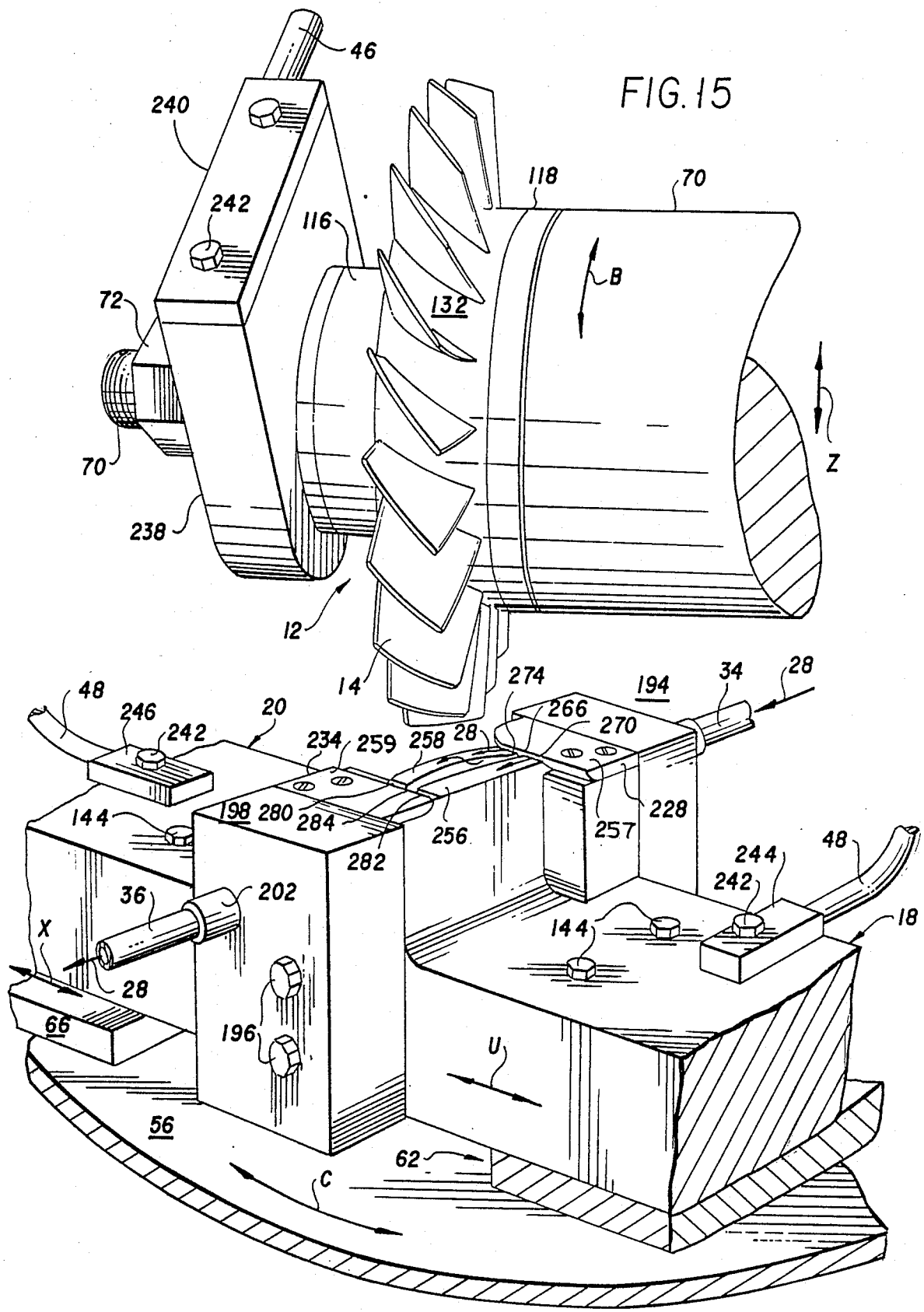
FIG. 15 is a perspective view of the workpiece 12 positioned just prior to the entry of a workpiece blank between the electrode pair illustrated in FIG. 12.

The first electrode 18 includes a generally rectangular support portion 140 having a plurality of apertures 142 through which retention bolts 144 extend for securing the electrode 18 to the support 62 (see FIG. 15). Electrode 18 further includes a working portion 146 for channeling electrolyte 28 and electrochemically machining the first face 120 of the blank 14.

The second electrode 20 similarly includes a support portion 148 having a plurality of the apertures 142 for receiving a plurality of the bolts 144 to secure the electrode 20 to the support 66 (see FIG. 15). The second electrode 20 also includes a working portion 150 for channeling the electrolyte 28 and for electrochemically machining the second face 122 of the blank 14.

The working portion 146 of the first electrode 18 includes in sequential placement an inlet end 152, a converging face 154, a first throat face 156, a generally convex work face 158, a second throat face 160, a diverging face 162, and an outlet end 164. Similarly, the working portion 150 of the second electrode 20 includes in sequential placement an inlet end 166, a converging face 168, a first throat face 170, a generally concave work face 172, a second throat face 174, a diverging face 176, and an outlet end 178.

Figure 12:
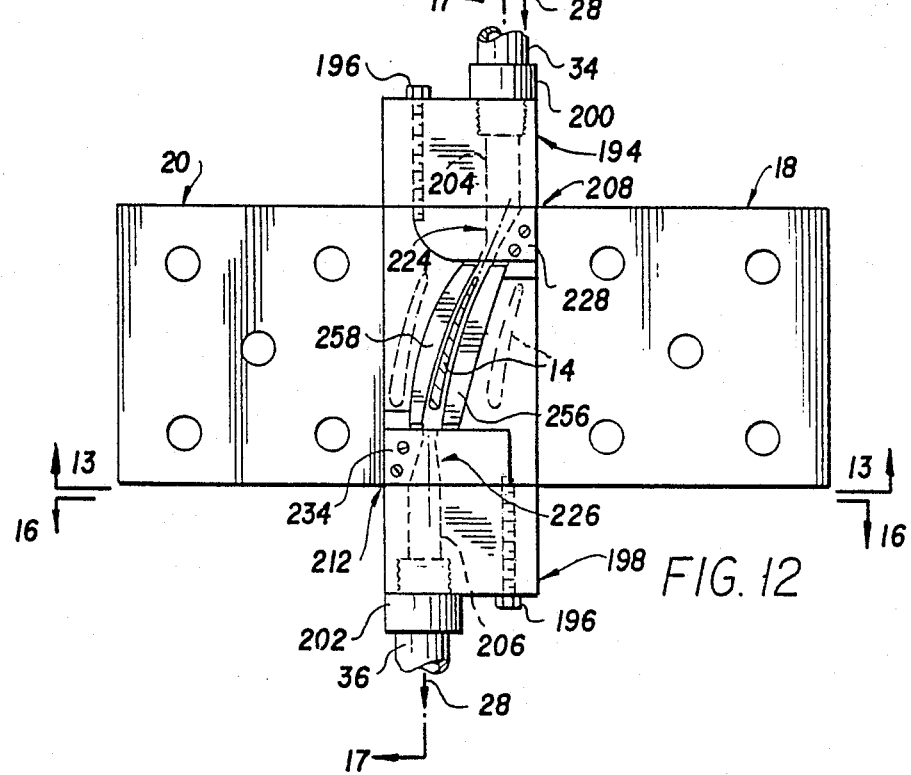
FIG. 12 is a top plan view of the electrodes illustrated in FIGS. 10 and 11 in a machining position over the workpiece of FIG. 8.
Figure 13:
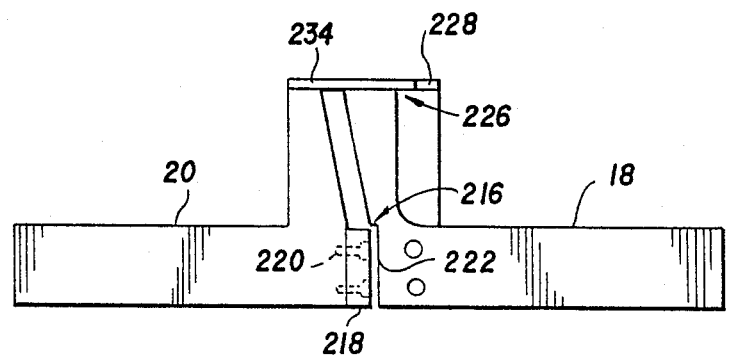
FIG. 13 is a side view of the electrode pair illustrated in FIG. 12 taken along line 13—13.
Figure 14:
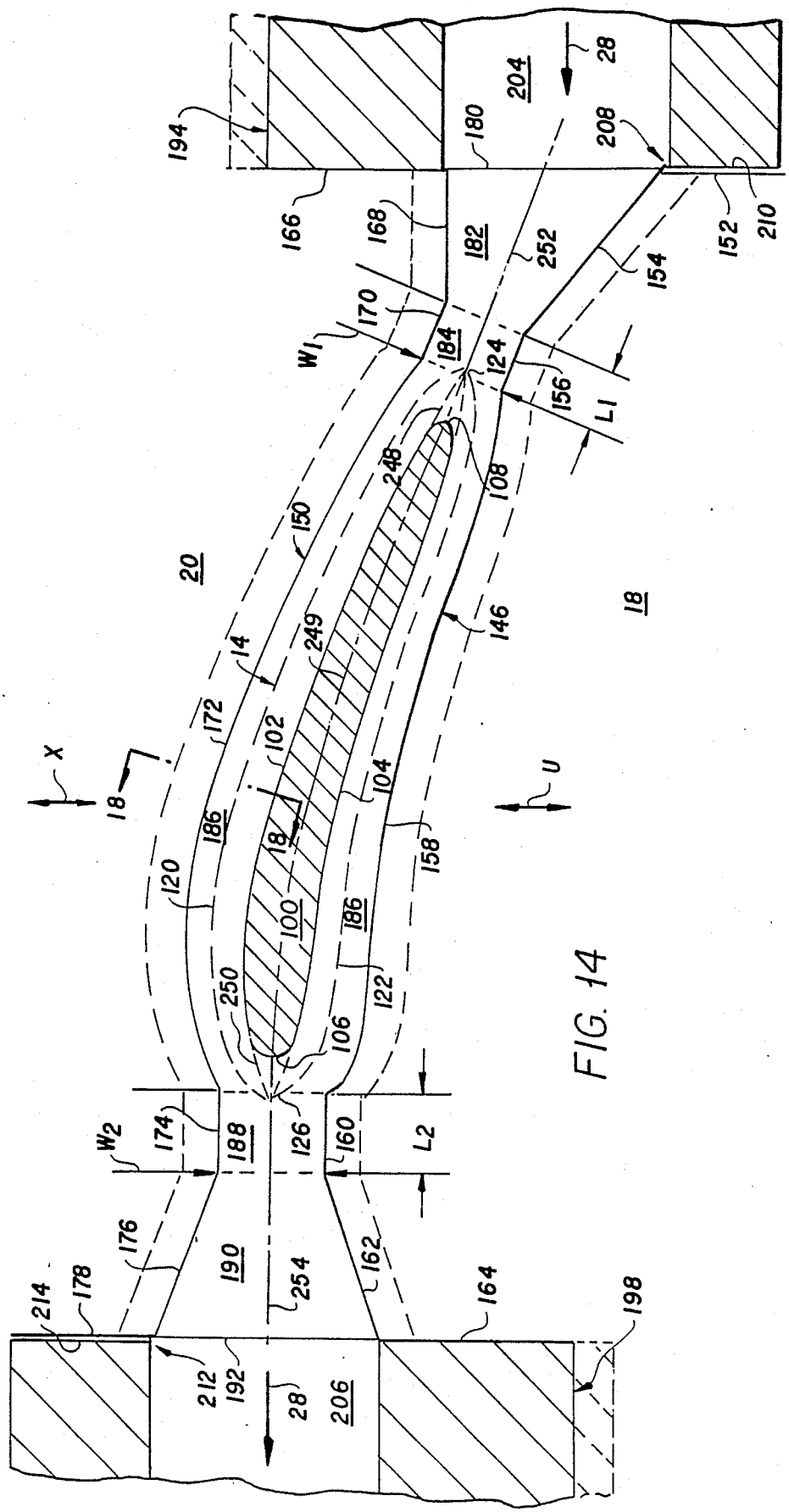
FIG. 14 is a sectional view in part through the electrode pair illustrated in FIG. 17 taken along line 14—14.

As illustrated in more particularity in FIGS. 12–14, the first and second electrodes 18, 20 are positionable about one of the blanks 14 so that the working portions 146 and 150 define therebetween in sequential placement an inlet 180, a converging nozzle 182, a first throat 184, a working space 186 for receiving the blank 14, a second throat 188, a diverging nozzle 190 and an outlet 192. More specifically, the working portions 146 and 150 are spaced from and face each other so that the inlet ends 152, 166; converging faces 154, 168; first throat faces 156, 170; work faces 158, 172; second throat faces 160, 174; diverging faces 162, 176; and outlet ends 164, 178 define therebetween the above recited elements 180–192, respectively.

As illustrated, for example, in FIGS. 12 and 15, the electrolyte channeling means 26 further includes a nonconductive inlet block 194 suitably fixedly connected to the second electrode 20 by a pair of bolts 196, for example, and a nonconductive outlet block 198 suitably fixedly connected to the first electrode 18 by another pair of the bolts 196, for example. The blocks 194, 198 are made from a suitable electrically nonconductive material which is also noncorrosive and will not absorb the electrolyte 28, such as, for example, a laminated fiberglass/epoxy material conventionally known as Military Specification G-10. The blocks 194, 196 are suitably connected in fluid communication with the conduits 34, 36, respectively, by hollow bushings 200, 202, respectively, which are threadingly engaged in the blocks 194, 198.

As illustrated in more particularity in FIGS. 16 and 17, the inlet block 194 includes a generally diverging inlet plenum 204 in fluid communication with bushing 200, and the outlet block 198 includes a generally converging outlet plenum 206 in fluid communication with bushing 202. FIGS. 12, 14 and 17 illustrate that the inlet plenum 204 is aligned in fluid communication with substantially the entire inlet 180 of the electrode pair, and the outlet plenum 206 is aligned in fluid communication with substantially the entire outlet 192 of the electrode pair.

FIGS. 12, 14 and 17 illustrate the electrodes 18 and 20 in an operating position with a first workpiece blank 14 positioned between the work faces 158 and 172. Inasmuch as the electrolyte 28 is channeled through the inlet block 194 between the working portions 146 and 150 and out the outlet block 198, it is desirable to provide suitable means for sealing the electrodes 18, 20 to substantially prevent leakage of the electrolyte 28, which could cause undesirable electrochemical machining of unintended portions of the blisk 12. The sealing means includes an inlet seal 208 defined by a seal portion 210 of the inlet block 194, which is slidingly engageable with the inlet end 152 of the first electrode 18. Inasmuch as the inlet block 194 is fixedly secured to the second electrode 20, an effective seal therebetween is also provided. The inlet seal 208 allows the first electrode 18 to move relative to the inlet block 194 and provide an effective seal which substantially prevents leakage of electrolyte 28 at the inlet 180.

The sealing means also includes a similar outlet seal 212 defined by a seal portion 214 of the outlet block 198, which is slidingly engageable with the outlet end 178 of the second electrode 20. Inasmuch as the outlet block 198 is fixedly secured to the first electrode 18, an effective seal is formed therebetween. The outlet seal 212 provides a seal which is effective for accommodating the relative movement between the outlet block 198 and the second electrode 20 for substantially preventing leakage of the electrolyte 28 at the outlet 192.

As illustrated in FIGS. 10, 13 and 17, the sealing means further includes a top seal 216, which is positioned over the top 128 of the blank 14. The top seal 216 is defined by slidingly engageable seal portions of the working portions 146, 150 of the first and second electrodes 18, 20. More specifically, the top seal 216 includes, in an exemplary embodiment, a nonconductive seal block 218 fixedly connected to one end of the working portion 150 of the electrode 20 by a plurality of screws 220. The seal block 218 is also made of a suitable nonconductive material such as the G-10 described above. Top seal 216 further includes a complementary recess 222 formed in the opposing end of the working portion 146 of the first electrode 18. The top seal 216 accommodates relative movement between the electrodes 18 and 20 while providing sliding movement between the block 218 and the recess 222 to provide a seal for substantially preventing the leakage of electrolyte 28 therethrough.

The seal block 218 and recess 222 arrangement is particularly effective to minimize any radial deflection of the primarily transverse flow of the electrolyte 28 as best seen in FIG. 17. Any such radial deflection could cause machining of undesirable radii at the intersections of the blank top 128 and the first and second edges 124, 126 in some blank 14 designs.

In other designs the relatively complex block 218/recess 222 arrangement may be eliminated, and a simpler seal 216 may be used instead. For example, a simple tongue and groove seal may be located in the area in which the block 218 is shown. Suitable U-shaped recesses could be formed in the electrode pair to face each other, and an elongate flat member could be positioned in the recesses to create the tongue and groove seal when the electrodes 18 and 20 are positioned together (not shown).

As illustrated in FIGS. 10–13, the sealing means further includes a first bottom seal 224 and a similar second bottom seal 226 spaced from and positioned opposite to the top seal 216 for substantially preventing the leakage of electrolyte 28 from at least portions of the converging nozzle 182 and the diverging nozzle 190 radially towards the first and second shoulders 116, 118 of the workpiece 12 (see FIG. 17). In the exemplary embodiment illustrated, the bottom seals are also positioned to prevent similar radial leakage from also the first and second throats 184 and 188, although in other designs they need not be so positioned.

The first bottom seal 224 includes a nonconductive seal pad 228 suitably fixedly connected to a support end 229 of the working portion 146 of the first electrode 18 by a pair of screws 230, for example. The pad 228 is formed of a suitable nonconductive material such as G-10, as above mentioned. The pad 228 extends from the working portion 146 and over the converging face 154 and the first throat face 156 of the first electrode 18. A complementary recess 232 is formed in the working portion 150 of the second electrode 20 over the first throat face 170 and the converging face 168 for receiving the pad 228 in reciprocating engagement therewith.

Similarly, the second bottom seal 226 includes a similar nonconductive seal pad 234 (G-10 material) fixedly attached to a support end 235 of the working portion 150 of the second electrode 20 by a pair of similar screws 230, for example. The seal pad 234 extends from the working portion 150 over the diverging face 176 and the second throat face 174. A complementary recess 236 is formed in the working portion 146 of the first electrode 18 over the diverging face 162 and the second throat face 160 for receiving the pad 234 in reciprocating engagement therewith.

When the electrodes 18 and 20 are positioned for machining as shown in FIG. 12, the seal pads 228, 234 overlap the recesses 232, 236, respectively, for creating seals which accommodate relative translational movement of electrodes 18 and 20 and substantially preventing leakage of electrolyte 28 in the radial direction between the working space 186 and both the inlet 180 and the outlet 192 (see FIG. 14). Of course, such overlapping members have relatively small gaps therebetween, but they are nevertheless effective for reducing and substantially preventing leakage which would otherwise occur without their use.

FIG. 15 illustrates the relative position of the workpiece 12 and electrodes 18 and 20 just prior to movement into final position for electrochemical machining. In particular, the workpiece 12 is suitably secured to the shaft 70 by the nut 72. Between the nut 72 and the workpiece 12 is an electrically conducting spacer block 238 to which an end 240 of the positive cable 46 is suitably secured by a pair of bolts 242, for example. The block 238 provides an electrical contact for flow of current to the workpiece 12. Of course, the workpiece 12 is suitably conventionally electrically insulated from the remainder of the shaft 70, for example by suitable insulating sleeves and spacers (not shown).

Alternatively, the cable 46 could be suitably connected to the shaft 70 to provide current through the center of the shaft 70 to the workpiece 12. In such an arrangement the cable 46 would be hidden entirely within the housing 16 and shaft 70, thus providing additional space in the working area of the machine 15 where the workpiece 12 is located.

The negative cable 48 includes a first end 244 suitably fixedly secured to the first electrode 18 by a similar bolt 242, and a second end 246 suitably fixedly secured to the second electrode 20 by another bolt 242, for example.

FIG. 17 illustrates the workpiece 12 including the first blank 14 relative to the electrodes 18 and 20 at a point in time at final electrochemical machining of the blank 14. FIG. 14 illustrates a cross section through the structure shown in FIG. 17 at about 50 percent of the radial height of the blank 14. Shown in solid line is a finally machined blade 100 and the positions of the electrodes 18 and 20 and the blocks 194 and 198. Shown in dashed line is the outline of the workpiece blank 14, and the relative positions of the electrodes 18 and 20 and the blocks 194 and 198 just prior to commencement of electrochemical machining. A gap of about 8 mils for electrolyte flow between the blank 14 and the machining portions of the electrodes 18, 20 is accurately maintainable using the apparatus of this invention.

The preferred embodiment of the invention includes several features for ensuring that a precisely machined blade 100 of the blisk 98 results from a single operation of electrochemical machining of a blank 14 of the workpiece 12. In particular, and for example, the inlet plenum 204 is shaped as shown in FIGS. 14 and 17 in a diverging nozzle to result in a rapid transition of flow from the bushing 200 to a substantially uniform flow at the inlet 180 of the electrode pair. The converging nozzle 182 and the first throat 184 are provided in part to assist in ensuring a uniform flow of the electrolyte 28 along the entire radial extent of the blank 14 from the base 130 to the top 128.

The first throat 184 additionally has a finite length $L_1$, which is not simply a single plane, which is effective for preventing the formation of a vena contracta downstream of the throat 184 to additionally ensure uniform flow. Furthermore, throat 184 is positioned to extend at least over a portion of the first edge 124 of the blank 14 in the initial cutting position prior to removal of material from the blank 14. This will ensure that any burr 248 which might otherwise form at the first edge 124 during machining will be removed by electrochemical machining action partly by the first throat faces 156 and 170. Such a burr 248 is undesirable because it might lead to damaging sparking.

The work faces 172 and 158 are suitably conventionally shaped for obtaining the desired shape of the first and second sides 102, 104, respectively, of the blade 100, and in the example illustrated will machine generally convex and concave sides, respectively.

The second throat 188 similarly has a finite length $L_2$ to help ensure a uniform flow of the electrolyte 28 along the entire radial extent thereof from the base 130 to the top 128 of the blank 14, and over the second edge 126. Both the lengths $L_1$ and $L_2$ should not be so large as to effect undesirable pressure losses therefrom. The second throat 188 also extends at least over a portion of the second edge 126 of the blank 14 in the initial cutting position to ensure that any burr 250 which might form along the second edge 126 is removed during electrochemical machining to avoid undesirable sparking.

The blank 14 illustrated in FIG. 14 has an arcuate camber line 249 extending from the first edge 124 to the second edge 126. The electrode pair is dimensioned in a preferred embodiment so that the camber line 249 is positionable to extend partially into the first and second throats 184, 186 to remove burrs as above described. Also, the relative position of the camber line 249 with respect to the outlet end of the first throat 184 and the inlet end of the second throat 188 helps control the final chord length and locations of the leading and trailing edges 106, 108 of the blade 100.

The first and second throats 184 and 188 also have widths $W_1$ and $W_2$, respectively, which define a first throat flow area $A_1$ of the entire radial extent of the first throat 184, and a second throat flow area $A_2$ of the entire radial extent of the second throat 188. The first throat flow area $A_1$ and the width $W_1$ are preferably larger than the second throat flow area $A_2$ and the width $W_2$, respectively. This is preferred to provide a predetermined flow restriction at the downstream side of the working space 186 to partly ensure that uniform radial flow of the electrolyte 28 is maintained across the entire radial extent of the blank 14. This also partly ensures uniform electrochemical machining and reduces the likelihood of any undesirable sparking which might otherwise occur in areas of nonuniform or inadequate flow. This arrangement can also assist in ensuring the prevention of striations in the first and second faces 120 and 122 of the blank 14 from electrochemical machining.

The diverging nozzle 190 is preferred for reducing flow restriction downstream of the second throat 188.

It is also preferred that the converging nozzle 182 and the first throat 184 be formed substantially symmetrically about a centerline axis 252 disposed substantially normal to the first edge 124 and colinear with the camber line 249. This is preferred to partly ensure that an equal volume of electrolyte 28 is channeled over the first and second faces 120 and 122. It is also preferred that the second throat 188 and the diverging nozzle 190 also be disposed substantially symmetrically about a centerline axis 254 disposed normal to the second edge 126, and colinear with the camber line 249, to additionally assist in ensuring equal volumes of flow of the electrolyte 28 over the first and second faces 120 and 122. However, for certain blade shapes the above orientations may be made unsymmetrical for obtaining equal volumes of flow of electrolyte 28 over the faces 120 and 122.

The outlet plenum 206 of the outlet block 198 is preferably converging to the bushing 202 to transition in a relatively short distance from the relatively long outlet 192 to the circular return conduit 36.

Inasmuch as the seal pads 228 and 234 prevent the leakage of flow from the converging nozzle 182, the first throat 184, the second throat 188, and the diverging nozzle 190, obtaining a uniform radial flow profile of the electrolyte 28 is assisted.

The present invention additionally includes means for simultaneously electrochemically machining the land 132 of the workpiece 12 into a final platform 114. FIGS. 10, 11 and 15 illustrate a bottom work edge, or land, 256 of the work face 158 of the first electrode 18 which is substantially colinear with an outer surface 257 of the seal pad 228. A second bottom work edge, or land, 258 of the work face 172 of the second electrode 20 is substantially colinear with an outer surface 259 of the seal pad 234. Both bottom edges 256, 258 are appropriately arcuate to match the curvature of the platform 114.

FIG. 18 illustrates electrochemical machining about the bottom edge 258 with similar machining occurring also about the bottom edge 256. The bottom edge 258 is shown in its initial position just prior to electrochemical machining. The blisk 100 and the platform 114 are shown in a final machined position. Shown in dashed lines are the initial positions of the blank 14 and the land 132 just prior to machining. Also shown in dashed line 260 is the final position of the bottom edge 258 after machining.

FIG. 18 illustrates that a portion of the electrolyte 28 is channeled from the working space 186 radially inwardly toward the land 132 and then axially outwardly substantially parallel thereto. The bottom edge 258 includes a corner edge 262 which electrochemically machines a complementary corner edge 264 into the blade 100 at the root 112 thereof. The bottom edge 258 simultaneously machines the root 112 of the blade 100 and a portion of the platform 114 of the blisk 12.

It will be noted that the electrolyte 28 flows primarily in a transverse direction over the blank 14 from the first edge 124 to the second edge 126 as illustrated in FIG. 17. Inasmuch as the bottom seals 224 and 226 do not extend over the working portion 186 as illustrated in FIGS. 12 and 14. The electrolyte 28 is allowed to flow radially out of the working space 186 and then transversely over both bottom edges 256 and 258 for machining the land 132 as above described. Accordingly, the electrolyte 28 transitions from flowing in the transverse direction to the radial direction and then transversely for machining the land 132.

In accordance with a preferred embodiment of the invention, transition means are provided to ensure that such transition of flow occurs without abrupt changes which could result in a local reduction or starvation of the electrolyte 28. Experience has shown that the lack of an adequate supply of the electrolyte 28 can cause undesirable sparking, or arcing, and local striations in the blank 14.

More specifically, such transition means are illustrated in the exemplary embodiment shown in FIGS. 10–12 and 15. In particular, the first bottom seal 224 is shown as being positioned on the inlet side, or upstream, of the blank 14. As electrolyte 28 flows over the seal pad 228 of the first seal 224, it must transition from transverse flow to radial flow as it flows over a downstream end 266 of the pad 228 as shown in FIG. 15. The transition means include the pad 228 having an inner surface 268 which is arcuate and diverging with respect to the transverse direction of electrolyte flow 28 as shown in FIGS. 10 and 11. This is accomplished in the embodiment shown by the pad 228 having a thickness decreasing in the downstream direction. The support end 229, to which the pad 228 is attached, has a shape complementary to the pad 228 and has a portion which is spaced from the pad downstream end 266 to define a first gap 270. And, similarly, the recess 232 includes an arcuate portion 272, which is complementary to the inner surface 268 and is spaced therefrom to define a second gap 274.

The gaps 270 and 274 are in flow communication with the converging nozzle 182 so that a portion of the electrolyte 28 is channeled through the gaps and over the bottom edges 256 and 258 as shown in FIG. 15.

Accordingly, the transition means, including the arcuate inner surface 268 and gaps 270, 274, cause the electrolyte 28 to transition smoothly from the transverse direction to the radial direction upstream of the blank 14. This ensures an adequate supply of the electrolyte 28 flowing over the bottom lands 256 and 258 and, in particular, over the upstream ends thereof, for reducing the likelihood of sparking and striations.

Furthermore, similar transition means are provided for the second bottom seal 226. This is particularly desirable where the flow of electrolyte 28 will be reversed so that it flows transversely from the second edge 126 to the first edge 124, i.e. opposite to the flow direction shown in FIG. 17, for example.

This second transition means includes a similar, arcuate, diverging inner surface 276 of the seal pad 234, and complementary shaped support end 235 and arcuate portion 278 of recess 236. The transition means also includes gaps 280 and 282 defined between an end 284 of the pad 234 and a portion of the support end 235 and the arcuate portion 278, respectively. The gaps 280, 282 are in flow communication with the diverging nozzle 190. Accordingly, when the flow of electrolyte 28 is reversed to that shown in FIG. 17, the means including the inner surface 276 and gaps 280, 282 provide an analogous smooth transition from transverse to radial flow.

When the flow of electrolyte 28 is as shown in FIG. 17, it will be noted that the inner surface 268 of the pad 228 diverges, whereas the inner surface 276 of the pad 234 converges (see FIGS. 10, 11 and 14). In this mode of operation, the inner surface 276, which is at the downstream end of the blank 14, assists in providing a smooth transition of electrolyte from the working space 186 near the bottom edges 256 and 258 into the second throat 188.

Accordingly, a single blade 100 and a portion of the platform 114 can be finally machined in one operation from the workpiece 12, without need for additional machining operations thereof. Of course, the blade tips 110 are conventionally ground at assembly to fit precisely within a turbine shroud. However, this is also done for blisks machined by conventional methods as well.

The portion of the electrolyte 28 which flows over the top edges 256 and 258 is collected in the drain 38 for return to the electrolyte supply 32. When the electrodes 18, 20 are used for machining a blisk 98, adjacent blanks 14, as illustrated in dashed line in FIG. 12, must be protected from this electrolyte flow for avoiding unwanted machining. Accordingly, the electrodes 18, 20 may be provided with suitable reliefs or back surfaces 286 and 288, respectively, as illustrated in FIG. 11, which provide space for accommodating adjacent blanks 14. The back surfaces 286 and 288 are suitably coated with any conventional nonconductive material, such as epoxy, for preventing unwanted machining of adjacent blanks 14 by the back surfaces 286 and 288.

Although the electrodes 18, 20 may also be used for machining single airfoil blanks 14 not integral with a blisk, when they are utilized for machining blanks 14 for a blisk 98, the seal pads 228 and 234 provide an additional advantage by reducing the amount of electrolyte 28 leakage over the shoulders 116 and 118 which would otherwise occur from between the working portions 146, 150 away from the working space 186.

To additionally reduce leakage of electrolyte 28, the outer surfaces 257 and 259 of seal pads 228 and 234, respectively, are curved and complementary to the curvature of the shoulders 116 and 118 to minimize the gaps therebetween. The curvature of the former elements in the embodiments illustrated in FIGS. 15 and 17, for example, is relatively small and is not perceptible in the Figures. However, for relatively small diameter workpieces 12, such curvature would be larger and clearly perceptible.

The seal pads 228 and 234 also provide electrical insulation to prevent the unwanted machining of the shoulders 116 and 118, which would otherwise occur without their use.

Inasmuch as the throat widths $W_1$ and $W_2$ are relatively large at the initiation of machining (FIGS. 14 and 17), most of the electrolyte 28 will flow transversely over the blank 14 from the inlet 180 to the outlet 190, and relatively little of the electrolyte 28 will flow around the bottom edges 256 and 258. Accordingly, suitable means are provided to provide back pressure in the outlet plenum 206 to ensure that a portion of the electrolyte 28 is suitably channeled over the bottom edges 256 and 258 for machining the land 132. In one embodiment of the invention, suitable back pressure may be obtained by utilizing a valve 294, as illustrated in FIG. 1, which is disposed in serial flow in the return conduit 36. By suitably adjusting the valve 294, back pressure can be provided in the outlet plenum 206.

In accordance with another embodiment of the invention, a new and improved method of forming the blisk 98 from the workpiece 12 having the plurality of circumferentially spaced blanks 14 is disclosed. Initially, the second turntable 74 indexes one of the blanks 14 into alignment for machining. The third translation means 76 translates the workpiece 12 to the electrode pair. FIG. 15 illustrates the first blank 14 in a position just prior to being inserted between the electrode pair. The control means 50 coordinates movement of the first and second electrodes 18, 20 and the workpiece 12 in the X, U, C and Z directions for positioning the first and second electrodes 18, 20 adjacent to the first and second faces 120, 122 of the first blank 14. The power means 30 is then used for supplying a positive voltage to the first blank 14 and a negative voltage to the first and second electrodes 18, 20 through the cables 46 and 48. The electrolyte channeling means 26 is effective for channeling the electrolyte 28 between the first and second faces 120, 122 of the blank 14 and the work faces 158, 172 of the first and second electrodes 18, 20 for electrochemically machining the first blank 14. The control means 50 is then effective for translating the first and second electrodes 18, 20 toward the first and second faces 120, 122 of the first blank 14 in the U and X directions and generally normal thereto. Simultaneously, the control means 50 is effective for translating the workpiece 12 toward the first and second electrodes 18, 20 in the Z direction.

The machine 15 is effective for providing independent translation of the electrodes 18 and 20 and the workpiece 12 in the X, U and Z directions. However, such movement is coordinated for maintaining proper relative positions between the blank 14 and the electrodes 18 and 20. Furthermore, the electrodes 18 and 20 may additionally be rotated together in the C direction on the first turntable 56, which provides for a twisting action for coordinating movement of the electrodes 18, 20 down over a twisted blank 14.

During electrochemical machining, the movement of the blank 14 and the electrodes 18, 20 is coordinated in the X, U, Z and C directions for maintaining a substantially uniform space of about 8 mils, for example, between the work faces 158 and 172 and the blank 14 for obtaining substantially uniform electrochemical machining without undesirable sparking. The machine 15 having the five degrees of movement X, U, Z, C and B in accordance with the invention results in a relatively simple machine which moves both the electrode pair and the workpiece 12 for accurately maintaining relative positions thereof for obtaining final electrochemical machining of a blade in a single operation on a blank 14.

Upon completion of machining of the first blank 14, the control means 50 reverses the movement of the electrodes 18, 20 and the workpiece 12, withdraws the first blank 14 from between the electrodes 18, 20 and indexes the workpiece 12 in the B direction for placing in position an adjacent, second blank 14. The second blank 14 is then electrochemically machined in a manner similar to the first blank 14. Additional blanks 14 are then sequentially formed until a final blisk 98 is formed from the workpiece 12.

A significant feature of one embodiment of the invention is channeling the electrolyte 28 in substantially a circumferential direction from the first edge 124 toward the second edge 126 over the first and second faces 120, 122. The first and second edges 124, 126 correspond with either the leading and trailing edges 106, 108 or the trailing and leading edges 108, 106, respectively. In accordance with a preferred embodiment of the invention, the electrolyte 28 is channeled from the first edge 124 towards the second edge 126 for forming a trailing edge 108 and a leading edge 106, respectively. Tests show that better control of dimensions of the leading edge 106 is obtained if electrolyte flow is from the trailing edge 108 toward the leading edge 106.

Leading edges 106 and trailing edges 108, having a radius of about 0.005 inch, have been accurately machined using apparatus constructed in accordance with the invention.

The improved method may also include accelerating the electrolyte 28 through the converging nozzle 182, then channeling the electrolyte 28 through the first throat 184, the throat having a minimum area relative to the nozzle 182, then channeling the electrolyte 28 along both the first and second faces 120 and 122 of the blank 14, then channeling the electrolyte 28 through the second throat 188 having a minimum area with respect to the diverging nozzle 190, and then channeling the electrolyte 28 through the diverging nozzle 190.

The method may also include translating the first and second electrodes 18, 20 toward each other such that portions of the first and second throats 184 and 188 electrochemically machine away material from the first and second edges 124 and 126 of the blank 14 for generating finally machined leading and trailing edges 106 and 108 which do not require any additional machining operations for completion.

The method may also include channeling a portion of the electrolyte 28 from the working space 186 over the bottom edges 256 and 258 and between the base 130 of the blank 14 and the first and second electrodes 18, 20 for electrochemically machining the land 132 of the workpiece 12 into the platform 114 of the blisk 98.

While there have been described herein what are considered to be preferred embodiments of the invention, other modifications will occur to those skilled in the art from the teachings herein.

It is therefore desired to secure in the appended claims all such modifications as fall within the true spirit and scope of the invention. For example, although the sealing means disclosed herein are fixedly connected to one electrode and overlap the other electrode, they may be oppositely supported. Furthermore, inasmuch as substantially complementary electrodes 18 and 20 are utilized, features on one electrode may be interchanged with features on the other electrode, for example, the particular shape of the work faces 158 and 172. Yet further, shapes other than airfoil shapes may be machined in accordance with the invention.

Furthermore, the flow of electrolyte 28 can also be either from trailing-to-leading edge or vice versa, or alternating therebetween; and, accordingly, the functional flow relationship of the inlet block 194 and the outlet block 198 may be interchanged with respect to the first and second electrodes 18, 20.

Yet further, the invention may be used to machine blades of axially adjacent tandem blisks, i.e. two blisks integrally formed. However, in such an arrangement the space between the blisks may be relatively small and, therefore, may not allow the electrode pair 18, 20 to fit therein. Accordingly, another embodiment of the invention may omit the outlet block 198, seal pad 234 and most of the diverging faces 162, 176 to fit within the inter-blisk space. Instead of such elements a simple electrically insulating block (G-10 material) may be fixedly attached to one of the electrodes and overlap for reciprocal movement the other electrode to form a predetermined radial gap therewith. The block causes the electrolyte to flow through the gap which becomes the discharge outlet of the second throat 188. The gap provides controlled back pressure instead of using the valve 294, and the discharged electrolyte is collected in drain 38 instead of return conduit 36. This embodiment allows for a shorter electrode pair to fit between tandem blisks and the block also prevents unwanted machining of the second blisk because it is an electrical insulator.

Having thus described preferred embodiments of the invention, what is claimed as novel and desired to be secured by Letters Patent of the United States is:

1. A method of forming a blisk from a workpiece having a plurality of circumferentially spaced workpiece blanks, each having oppositely facing first and second side faces defined by a radially inner base, a radially outer top, a first edge, and a second edge, said method comprising:

positioning first and second electrodes adjacent to said first and second faces, respectively, of a first one of said blanks;

supplying a positive voltage to said first blank and a negative voltage to said first and second electrodes;

channeling an electrolyte between said first blank and said first and second electrodes for electrochemically machining said first blank;

moving said first and second electrodes toward said first and second faces of said first blank; and moving said first blank toward said first and second electrodes during said electrochemical machining of said first blank.

2. A method according to claim 1 wherein said first and second electrodes and said workpiece are translated independently from each other during said moving steps.

3. A method according to claim 1 wherein said first and second electrodes translate toward said first blank and rotate with respect thereto, and said first blank translates toward said first and second electrodes.

4. A method according to claim 3 wherein said first and second electrodes and said workpiece are moved independently from each other during said moving steps and are coordinated so that said first blank is electrochemically machined into a first blade.

5. A method according to claim 4 further comprising indexing said workpiece by rotation for aligning a second blank with said first and second electrodes and sequentially forming a second blade therefrom in a similar manner.

6. A method according to claim 4 wherein said electrolyte is channeled substantially circumferentially over said first and second faces.

7. A method according to claim 6 wherein said electrolyte is channeled from said first edge to said second edge of said first blank for forming a blade having a trailing edge corresponding to said first edge and a leading edge corresponding to said second edge.

8. A method according to claim 6 wherein a portion of said electrolyte is channeled between said face of said first blank and edges of said first and second electrodes for electrochemically machining a platform at said base of said workpiece.

9. A method according to claim 6 wherein said electrolyte is accelerated through a converging nozzle formed between said first and second electrodes, then channeled through a first throat, then channeled along both said first and second faces of said first blank, then channeled through a second throat, and then channeled through a diverging nozzle.

10. A method according to claim 9 wherein said first and second throats are defined by portions of said first and second electrodes, and said first and second electrodes are moved toward each other such that said portions electrochemically machine away material from said first and second edges of said blank.

11. An apparatus for electrochemically forming a blisk from a workpiece having a plurality of circumferentially spaced workpiece blanks, each having oppositely facing first and second faces defined by a radially inner base, a radially outer top, a first edge, and a second edge, said apparatus comprising:
a housing;
a pair of electrodes including a first electrode and a second electrode;
means for mounting said electrode pair to said housing;
means for mounting said workpiece to said housing;
means for channeling electrolyte to said electrode pair;
means for powering said electrode pair with a negative voltage and said workpiece with a positive voltage;
said electrode pair mounting means comprising:
a first turntable attached to said housing and rotatable about a first axis;
a first translation means attached to said first turntable for mounting said first electrode;
a second translation means attached to said first turntable for mounting said second electrode; and
said electrode mounting means being effective for translating said first and second electrodes toward each other and for rotating both said first and second electrode about said first axis;
said workpiece mounting means comprising:
a third translation means attached to said housing;
a second turntable attached to said third translation means and rotatable about a second axis; and
said workpiece mounting means being effective for translating said workpiece toward said first and second electrodes and rotating said workpiece about said second axis; and
means for controlling movement of said electrode pair mounting means and said workpiece mounting means.

12. An apparatus according to claim 11 wherein said control means is effective for rotating said second turntable to index a first blank into a machining orientation and translating said workpiece to said electrode pair, and for translating and rotating said electrode pair to a machining position over said first blank.

13. An apparatus according to claim 12 wherein said control means is effective for independently controlling said first and second turntables and said first, second and third translation means.

14. An apparatus according to claim 11 wherein said first and second axes are coplanar and substantially perpendicular to each other.

15. An apparatus according to claim 11 wherein said electrode pair comprises:
an electrically conductive first electrode having a support portion and a working portion for electrochemically machining said first face of said blank, said working portion having an inlet end and an outlet end;
an electrically conductive second electrode having a support portion and a working portion for electrochemically machining said second face of said blank, said working portion having an inlet end and an outlet end;
said first and second electrodes being positionable about said blank for defining an inlet and an outlet between said inlet and outlet ends, respectively, of said working portions of said first and second electrodes;
means for channeling electrolyte from said inlet to said outlet, portions of said channeling means being fixedly connected to at least one of said first and second electrodes; and
means for sealing said working portions of both said first and second electrodes to substantially prevent leakage of electrolyte from said inlet and outlet, portions of said sealing means being fixedly connected to at least one of said first and second electrodes.

16. An apparatus according to claim 15 wherein:
said channeling means comprises a nonconductive inlet block fixedly connected to said second electrode, said inlet block having an inlet plenum alignable with said inlet defined between said first and second electrodes;
and a nonconductive outlet block fixedly connected to said first electrode, said outlet block having an outlet plenum alignable with said outlet defined between said first and second electrodes; and
said sealing means comprises an inlet seal defined by a sealing portion of said inlet block slidingly engageable with said inlet end of said first electrode; and an outlet seal defined by a sealing portion of said outlet block slidingly engageable with said outlet end of said second electrode.

17. An apparatus according to claim 16 wherein said sealing means further comprises a top seal defined by a nonconductive seal block fixedly connected to one of said first and second electrodes, and a complementary recess disposed in the other of said first and second electrodes, said top seal being positionable over said top of said blank.

18. An apparatus according to claim 17 further including a first bottom seal for preventing electrolyte from leaking radially outwardly from said converging nozzle and said first throat, and a second bottom seal for preventing electrolyte from leaking radially outwardly from said second throat and said diverging nozzle.

19. An apparatus according to claim 18 wherein said first and second bottom seals each includes a seal pad fixedly attached to one of the electrode pair, and a complementary recess in the other of the electrode pair for receiving said pad in sealing engagement therewith.

20. An apparatus according to claim 19 wherein said first bottom seal is disposed in an upstream position relative to said second bottom seal, and further comprising transition means including an arcuate, diverging inner surface of said seal pad of said first bottom seal for transitioning electrolyte flow from a transverse direction to a radial direction for flowing over said bottom work edges.

21. An apparatus according to claim 20 wherein said transition means further includes gaps formed between a portion of said seal pad of said first bottom seal and said electrode pair for channeling electrolyte therethrough to flow over said bottom work edges.

22. An apparatus according to claim 15 wherein:
said working portion of said first electrode includes in sequential placement from said inlet end to said outlet end thereof a converging face, a first throat face, a work face, a second throat face, and a diverging face;
said working portion of said second electrode includes in sequential placement from said inlet end to said outlet end thereof a converging face, a first throat face, a work face, a second throat face, and a diverging face; and
said first and second working portions are positionable to face each other and define a converging nozzle between said converging faces, a first throat between said first throat faces, a working space between said work faces in which said blank is positionable, a second throat between said second throat faces, and a diverging nozzle between said diverging faces.

23. An apparatus for forming a blisk from a workpiece having a plurality of circumferentially spaced workpiece blanks, each having oppositely facing first and second side faces defined by a radially inner base, a radially outer top, a first edge, and a second edge, said apparatus comprising:
means for positioning first and second electrodes adjacent to said first and second faces, respectively, of a first one of said blanks;
means for supplying a positive voltage to said first blank and a negative voltage to said first and second electrodes;
means for channeling an electrolyte between said first blank and said first and second electrodes for electrochemically machining said first blank;
means for moving said first and second electrodes toward said first and second faces of said first blank; and
means for moving said first blank toward said first and second electrodes during said electrochemical machining of said first blank.

* * * * *

UNITED STATES PATENT AND TRADEMARK OFFICE
CERTIFICATE OF CORRECTION

PATENT NO. : 4,851,090

DATED : July 25, 1989

INVENTOR(S) : NORBERT ANTHONY BRUNS ET AL

It is certified that error appears in the above-identified patent and that said Letters Patent is hereby corrected as shown below:

On the title page:

Change first inventor's name from "Norbert A. Burns" to --Norbert A. Bruns--.

In Claim 11, Column 17, line 51 of the Patent, change "electrode" to --electrodes--.

Signed and Sealed this

Thirtieth Day of October, 1990

Attest:

HARRY F. MANBECK, JR.

*Attesting Officer*     *Commissioner of Patents and Trademarks*